3,110,363
BRAKE SYSTEMS
Charles S. Chapman, Jr., Grand Blanc, and Richard W. Craig, Flint, Mich., assignors to General Motors Corporation, Detroit, Mich., a corporation of Delaware
Filed Nov. 12, 1959, Ser. No. 852,407
11 Claims. (Cl. 188—69)

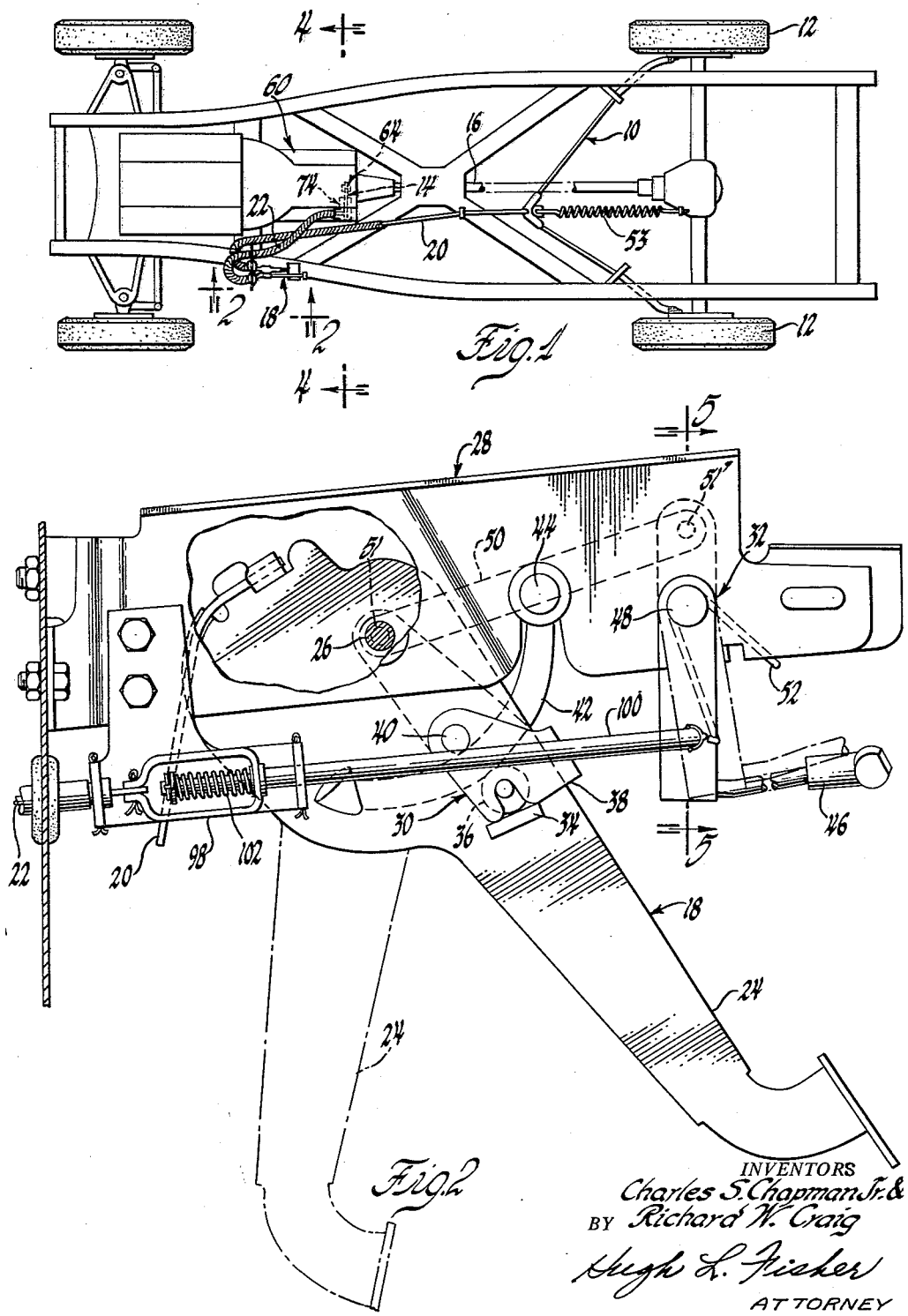

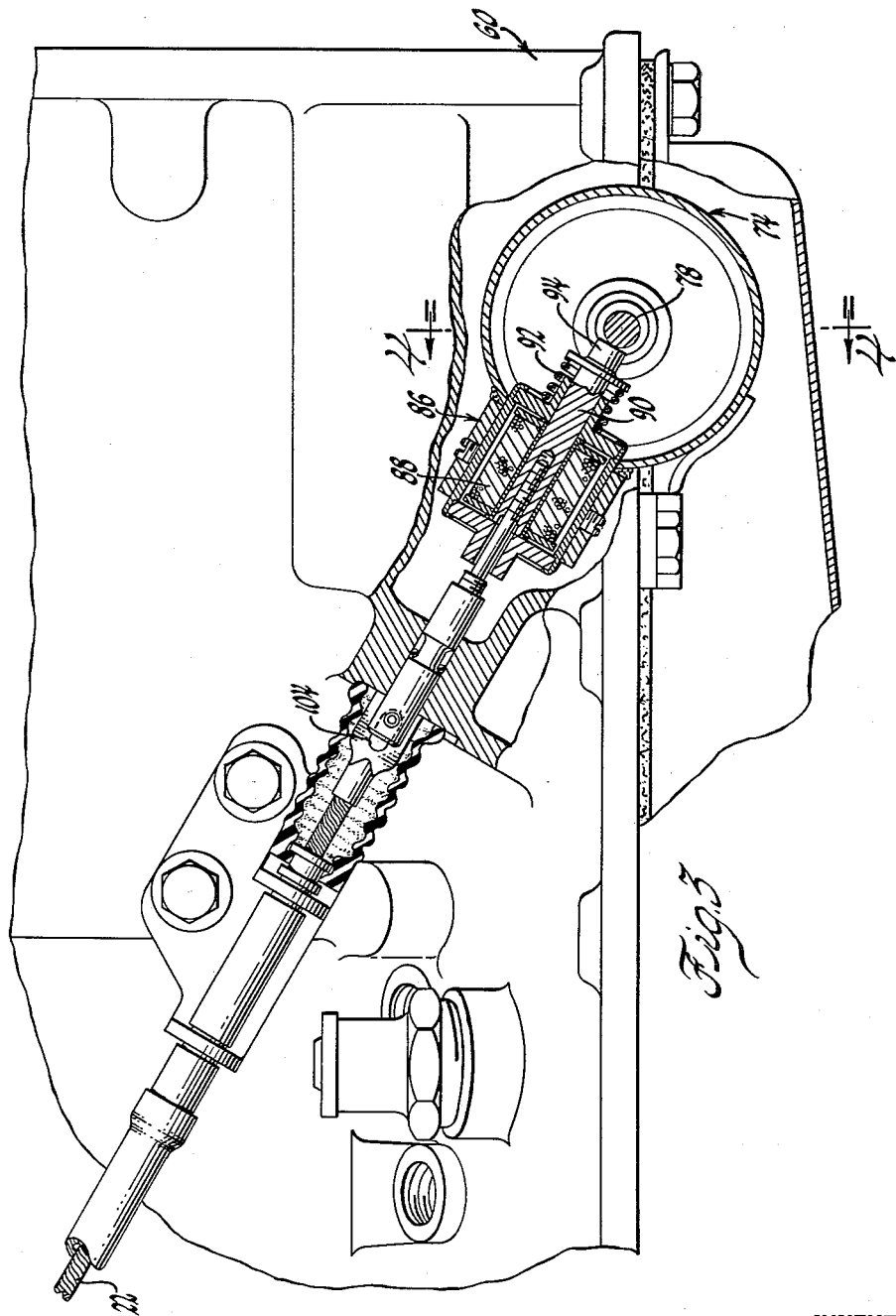

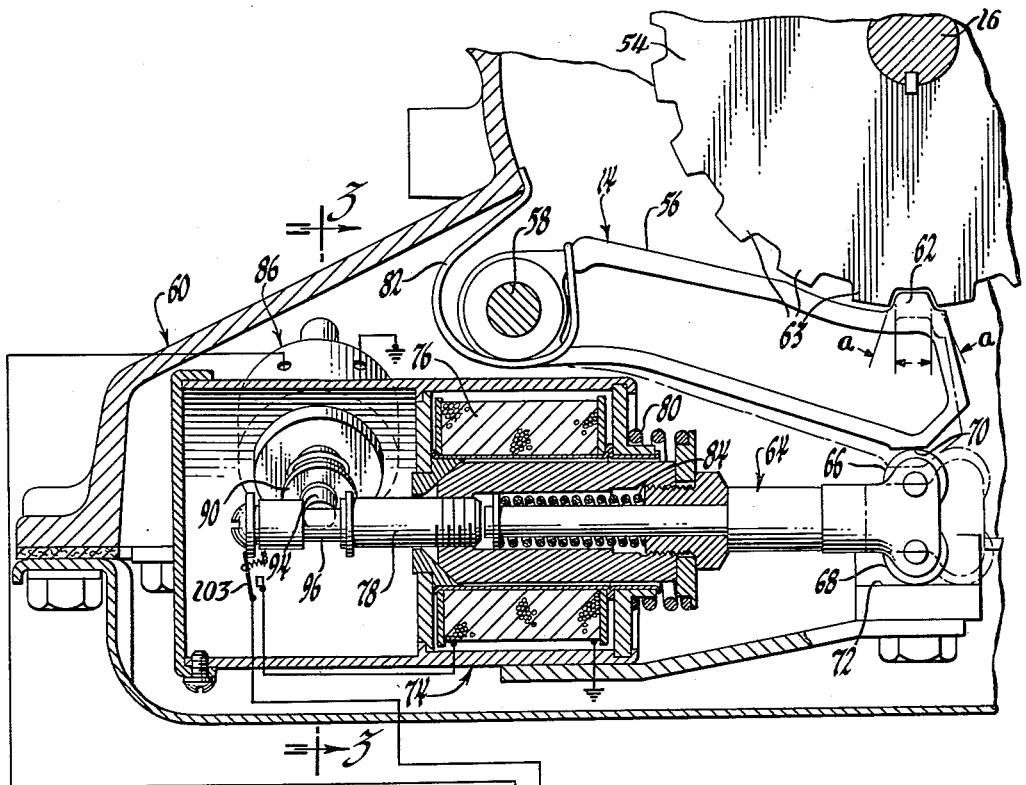
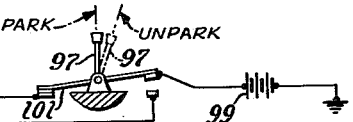
Fig. 4
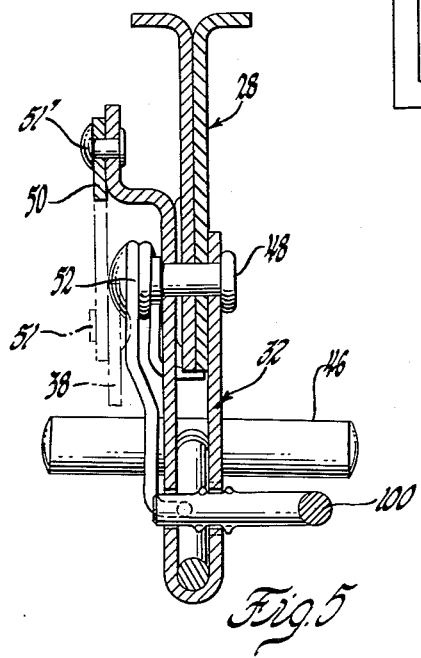
Fig. 5
INVENTORS
Charles S. Chapman Jr. &
BY Richard W. Craig
Hugh L. Fisher
ATTORNEY

United States Patent Office 3,110,363
Patented Nov. 12, 1963

This invention relates generally to brake systems and particularly to improvements in brake systems adapted for use, although not exclusively, with motor vehicles.

In general, any brake system, particularly one that is partially or completely automatic and that is power disengaged, should have some auxiliary provision for disengaging the brake in the event of failure. For instance, an electrically disengaged brake may malfunction due to the lack of electric current, and therefore, the brake will remain engaged unless some other provision is made. To explain further, consider a motor vehicle having the usual emergency wheel brake and additionally an electrically actuated transmission parking brake, the latter of the positive type. If for some reason the electrical system should fail, such that the positive transmission parking brake will not disengage, it can be seen that the vehicle could not be moved without damaging the parking brake. Consequently, some alternative way of manually disengaging the parking brake is needed so that the vehicle can be pushed or towed to a repair area.

With the foregoing in mind, the invention contemplates a brake system in which auxiliary provision is made in a unique manner for disengaging a brake in the event of failure of the main disengaging arrangement.

Specifically, the invention seeks to provide a brake system that with one control disengages one brake and in the event of failure of the disengaging medium for another brake, also disengages this latter brake. Somewhat more specifically stated, the invention contemplates a control both for disengaging a vehicle emergency brake and for causing a transmission parking brake to be disengaged in the event that the primary agency for disengaging the parking brake fails.

The foregoing and other objects and advantages of the invention will be apparent from the following description and from the accompanying drawings in which:

FIGURE 1 is a plan view of a vehicle chassis on which an embodiment of a brake system demonstrating the invention is installed;

FIGURE 2 is a view of a brake control mechanism for the brake system looking in the direction of arrows 2—2 in FIGURE 1;

FIGURE 3 is an enlarged sectional view of a part of the transmission parking brake control taken along lines 3—3 of FIGURE 4;

FIGURE 4 is a sectional view of the transmission parking brake taken along line 4—4 of FIGURE 3; and FIGURE 5 is a sectional view of a release device for the control mechanism taken along line 5—5 of FIGURE 2.

Referring first to FIGURE 1, the numeral 10 denotes a conventional emergency brake for rear wheels 12 of a vehicle and the numeral 14, a transmission parking brake employed to hold a transmission output shaft 16. The emergency brake 10 is operated by a manually operated control apparatus 18, which in this embodiment is foot operated. The control apparatus 18 through an emergency brake cable 20 actuates the emergency brake 10 and through a transmission parking brake cable 22 facilitates, as will become apparent, disengagement of the parking brake 14.

The control apparatus 18 may be of any appropriate construction, for instance that demonstrated in FIGURE 2 and described in detail in the application S.N. 804,456 to Chapman, Jr., filed April 6, 1959. Briefly, a pedal 24 is pivotally secured at 26 to a frame 28 situated in the driver compartment. The pedal 24 is made readily accessible preferably for left foot operation, and the pedal 24 may be moved from the full-line brake disengaged position to the broken-line brake engaged position whenever the emergency brake 10 is needed. A locking device designated generally at 30 holds the pedal 24 in any of the selected positions between the completely disengaged and completely engaged positions mentioned. Return of the pedal 24 to the disengaged position is accomplished through a releasing device shown generally at 32.

The locking device 30 includes a wedge block 34 formed on the pedal 24 and a wedge roller 36 that is supported by a wedge roller carrier 38. The carrier 38 is pivotally supported on the pedal 24 by a pin 40 and can be maneuvered so as to change the position of the wedge roller 36 relative to the wedge block 34 for reasons to be explained. Between the pin 40 and the wedge roller 36 is an arcuate bar 42 revolvably supported on the frame 28 at 44. With this locking device 30, when the pedal 24 is moved clockwise, as viewed in FIGURE 2, to any of the positions within the limits defined by the completely engaged and disengaged positions, the angular relationships of the wedge block 34, the roller 36, arcuate bar 42, and pin 40 are such that a wedge is formed holding the pedal 24 in the selected position.

Since the wedge action is one way, the pedal 24 can be moved clockwise and towards the fully engaged position without restraint but will not be permitted to return to the disengaged position unless there is a release of the wedge. For this purpose the releasing device 32 is afforded and comprises a hand lever 46 revolvably mounted on the frame 28 at 48. The hand lever 46 is connected to the wedge roller carrier 38 through a link 50 joined at 51 and 51′ respectively to carrier 38 and lever 46 (see FIGURE 5) and is biased to the full-line position depicted by a torsion spring 52. In this position, the carrier 38 maintains the roller 36 in the wedging position, but if the hand lever 46 is lifted so as to revolve about point 48 in a counterclockwise direction and to the broken-line position, the link 50 will cause the carrier 38 to revolve also counterclockwise about pin 40 and move the wedge roller 36 out of wedging engagement between the wedge block 34 and the arcuate bar 42. A return spring such as that at 53 in FIGURE 1 will cause the pedal 24 to be returned to the full-line brake disengaged position.

The transmission parking brake 14 is best illustrated in FIGURE 4 and includes a toothed locking gear 54 secured to the transmission output shaft 16. A locking element as pawl 56 is pivotally supported at 58 to a transmission casing 60 so that a pawl tooth 62 formed on the end thereof may move into and out of intermeshing engagement with teeth 63 on the locking gear 54.

Pivotal movement of the pawl 56 is accomplished by a pawl actuator 64. The pawl actuator 64 has revolvably supported thereon two rollers 66 and 68 in rolling contact with each other and respectively engaging a cam surface 70 formed on the pawl 56 opposite tooth 62, and a surface 72 formed along the transmission casing 60. Preferably, when the pawl 56 is in the FIGURE 4 engaged position, the centers of the rollers 66 and 68 form a line that extends through the center of the tooth 62 and the axis of rotation of the transmission output shaft 16 and locking gear 54 hereby affording an effective strut for resisting disengaging movement of the pawl 56.

The pawl actuator 64 is maneuvered between the full-line pawl engaged position and the broken-line disengaged position by a primary relay designated generally at 74. The relay 74 is provided with a winding 76, which may be of the solenoid type, and an armature 78, which slidably supports pawl actuator 64. An armature spring 80, when the relay 74 is deenergized, will bias the armature 78 and accordingly the pawl actuator 64 to the pawl disengaged position, whereupon a pawl disengaging spring 82 will urge the separation of the pawl tooth 62 and the teeth 63 on the locking gear 54; if desired, forcible ejection can be obtained by forming side angles (a) of the intermeshing teeth as viewed in FIGURE 4 so that they will induce disengagement under load and thus insure a disengagement.

If the primary relay 74 is energized to engage the pawl 56, and the alignment of the pawl tooth 62 is such that engagement is not possible, without revolving the locking gear 54 slightly, the armature 78 may still be moved to the FIGURE 4 position. However, the actuator 64 through the yieldable connection afforded by an actuator spring 84 may remain in the broken-line disengaged position until alignment of the teeth takes place and then the spring 84 will move the pawl actuator 64 to the full-line position and engage the pawl 56.

As just explained, the primary relay 74 when energized will cause the pawl 56 to be engaged. So that the winding 76 will not have to continue to draw current, provision is made for holding the primary relay armature 78 in the pawl engaged position. For this purpose a detent as secondary relay 86, best shown in FIGURE 3, is employed to hold the primary relay armature 78 in the FIGURE 4 full-line position so as to permit the winding of the primary relay 74 to be deenergized. The secondary relay 86 is also provided with a winding 88 which may likewise be of the solenoid type, and an armature 90. A spring 92 urges the secondary relay armature 90 downwardly when the secondary relay winding 88 is deenergized so that an end 94 thereon will engage a recess 96 formed in the end of the primary relay armature 78. The armature end 94 and the recess 96 together provide a stop that holds the primary relay armature 78 in the pawl engaged position without either the primary or secondary relays 74 and 86 requiring energization.

Any suitable electrical system may be employed for energizing the relays 74 and 86 in the desired sequence such as the system disclosed in the Patent 2,974,752 to Howard filed September 3, 1957. The electrical system will preferably be arranged as shown schematically in FIGURE 4 so that when the parking brake 14 is to be engaged by movement of a transmission shifter lever 97 to the Park position thereof, the primary relay 74 is connected to an electrical energy source, as vehicle battery 99, by a switch 101 and becomes energized. When the primary relay armature 78 moves to the pawl engaged position, it will be so aligned as to permit the secondary relay armature end 94 to be biased by spring 92 into engagement therewith and permit the primary relay 74 to be deenergized due to the opening of a series switch 103 by the end of the armature 78. With this construction, as can be seen, it is necessary before the parking brake 14 can be disengaged that the secondary relay 86 be energized so as to withdraw the armature 90 from the holding position of FIGURE 3. This is accomplished by moving the lever 97 to the Unpark position, whereupon the switch 101 will connect the secondary relay 86 to the battery 99 and the relay 86 will be energized.

As now can be seen, if the electrical system should fail, the secondary relay 86 could not be energized, and the vehicle could not be moved without in some way damaging the parking brake 14 because of the positive holding aspect. For this reason, the cable 22 is attached at one end to the secondary relay armature 90 and at the other end to a bracket 98 (see FIGURE 2) joined to the frame 28. The bracket 98 is connected to a rod 100 extending from the release device hand lever 46 through a take-up spring 102. The take-up spring 102 allows for manufacturing variations, e.g., the hand lever 46 may be only partially moved to the released position at which time the secondary relay armature 90 is moved to the fully disengaged position with respect to the primary relay armature recess 96. Without the spring 102, assuming there is a positive connection, the hand lever 46 could not be moved to the fully released position and the emergency brake 10 would still be left engaged. However, with the take-up spring 102 the fact that the secondary relay armature 90 is in the disengaged position does not impede the movement of the release lever 46 to the fully released position inasmuch as the spring 102 will permit the additional movement.

The take-up spring 102 can be so designed that the restraining force resulting when the secondary relay armature 90 is moved to the engaged position by the spring 92 is insufficient to interfere with this operation and will not require an excessive releasing force on the hand lever 46. Or, if desired, a lost motion slot can be provided as at 104 between the cable 22 and the secondary relay armature 92 such that the armature 90 can be moved to the engaged position without altering the position of the bracket 98 and spring 102.

Of course, when the hand lever 46 is moved to the released position, the lost motion connection 104 will be such that the secondary relay armature 90 is forced thereby from the engaged position.

From the foregoing, it can be seen that should the electrical system fail for some reason, the hand lever 46 for releasing the emergency brake 10 may be moved to the released position and cause the primary relay 74 to allow the primary solenoid armature spring 80 to bias the pawl actuator 64 to the pawl disengaged position so that the parking brake 14 may be disengaged and the vehicle can be moved to a repair area. If, at the time the hand lever 46 is moved to the released position, the emergency brake 10 is engaged, the pedal 24 being in one of the emergency brake engaged positions, the emergency brake 10 will also be disengaged. Additionally, the use of relays for operating the transmission parking brake eliminates the need for any concern about excessive driver effort being required to engage and/or disengage the parking brake 14. Also, the secondary relay provision renders the electrical arrangement fail-safe.

The invention is to be limited only by the following claims.

We claim:

1. In a brake system for a vehicle provided with a wheel drive shaft, the combination of an electrically operated brake for the wheel drive shaft, an actuator for the brake, a primary relay including an armature for yieldably moving the actuator so as to engage the brake, stop means on the primary relay armature, a secondary relay including an armature biased into engagement with the stop means on the primary relay armature so as to cause the actuator to maintain the brake engaged, the secondary relay when energized being arranged so that the armature thereof is out of engagement with the stop means, electrical means sequentially energizing and deenergizing the relays so as to cause the brake to be engaged and disengaged, and means withdrawing the secondary relay armature from engagement with the stop means in the event of a failure of the electrical means so as to permit the brake to be disengaged.

2. In a brake system for a vehicle, the combination of a transmission parking brake including a locking gear revolvable with a transmission output shaft, a pawl pivotally mounted for movement to and from an engaged position relative to the locking gear so as to prevent rotation of the transmission output shaft, a brake actuator for maneuvering the pawl, a primary relay including an armature for yieldably moving the actuator so as to move the pawl to the engaged position, stop means in the primary relay armature, a secondary relay including an armature biased into engagement with the stop means on the primary relay armature so as to cause the actuator to maintain the pawl in the engaged position, electrical means sequentially energizing and deenergizing the relays so as to cause the pawl to be moved to and from the engaged position, and means releasing operatively connected to the secondary relay armature thereby causing the secondary relay armature to be withdrawn from engagement with the stop means so as to permit the pawl to be moved from the engaged position.

3. In a brake system for a vehicle provided with a wheel drive shaft, the combination of a wheel brake, an electrically operated brake having engaged and disengaged positions relative to the wheel drive shaft, a wheel brake control member movable between brake engaged and brake disengaged positions for operating the wheel brake, means locking the wheel brake control member in the brake engaged position, an electrically operated detent arranged so as to be in a holding relationship with the electrically operated brake for maintaining the electrically operated brake in one of the positions, and means releasing the locking means and also mechanically connected to the detent so as to remove the detent from the holding relationship with the electrically operated brake when the releasing means is operated.

4. In a brake system for a vehicle provided with a wheel drive shaft, the combination of a wheel brake, a wheel drive shaft brake, a wheel brake control member movable between brake engaged and brake disengaged positions for operating the wheel brake, means locking the wheel brake control member in the brake engaged position, a primary relay for causing the wheel drive shaft brake to be engaged, a secondary relay so arranged as to be in a holding relationship with the primary relay and thereby cause the wheel drive shaft brake to be maintained engaged by the primary relay, and means releasing the locking means, the releasing means being also mechanically connected to the secondary relay so as to remove the secondary relay from the holding relationship with the primary relay and therein allow the wheel drive shaft brake to be disengaged when the releasing means releases the locking means.

5. In a brake system for a vehicle provided with a wheel drive shaft, the combination of a wheel brake, a wheel drive shaft brake, a wheel brake control member movable between brake engaged and brake disengaged positions for operating the wheel brake, means locking the wheel brake control member in the brake engaged position, a primary relay for causing the wheel drive shaft brake to be engaged, a secondary relay so arranged as to have a holding relationship with the primary relay and thereby cause the wheel drive shaft brake to be maintained engaged by the primary relay, electrical means sequentially operating the relays so as to cause the wheel drive shaft brake to be engaged and disengaged, and means releasing the locking means, the releasing means also being mechanically connected to the secondary relay for removing the secondary relay from the holding relationship with the primary relay so as to allow the wheel drive shaft brake to be disengaged when the releasing means releases the locking means.

6. In a brake system for a vehicle provided with a wheel drive shaft, the combination of a wheel brake, a wheel drive shaft brake, a wheel brake control member movable between brake engaged and brake disengaged positions for operating the wheel brake, means locking the wheel brake control member in the brake engaged position, an actuator for operating the wheel drive shaft brake, a primary relay including an armature operative to maneuver the actuator so as to cause the wheel drive shaft brake to be engaged, a second relay so arranged as to have a holding relationship with the primary relay armature and thereby cause the actuator to maintain the wheel drive shaft brake engaged, electrical means sequentially energizing and deenergizing the relays so as to cause the wheel drive shaft brake to be engaged and disengaged, and means releasing the locking means, the releasing means also being mechanically connected to the secondary relay for removing the secondary relay from the holding relationship with the primary relay armature so as to allow the wheel drive shaft brake to be disengaged when the releasing means releases the locking means.

7. In a brake system for a vehicle provided with a wheel drive shaft, the combination of a wheel brake, a wheel drive shaft brake, a wheel brake control member movable between brake engaged and brake disengaged positions for operating the wheel brake, means locking the wheel brake control member in the brake engaged position, an actuator for the wheel drive shaft brake, a primary relay including an armature for yieldably moving the actuator so as to engage the wheel drive shaft brake, stop means on the primary relay armature, a secondary relay including an armature biased into engagement with the stop means on the primary relay armature so as to cause the actuator to maintain the wheel drive brake engaged, electrical means sequentially energizing and deenergizing the relays so as to cause the wheel drive shaft brake to be engaged and disengaged, and releasing means so arranged as to release the locking means and operatively mechanically connected to the secondary relay armature thereby also causing the secondary relay armature to be withdrawn from engagement with the stop means so as to permit the wheel drive shaft brake to be disengaged in the event of a failure of the electrical means and so as to permit the wheel brake control member to move to the wheel brake to the disengaged position.

8. In a brake system for a vehicle, the combination of an emergency wheel brake, a transmission parking brake including a brake element for positively preventing rotation of a transmission output shaft in an engaged position thereof, a brake actuator for maneuvering the brake element to and from the brake engaged position, a wheel brake control member movable between brake engaged and brake disengaged positions for operating the wheel brake, means locking the wheel brake control member in the brake engaged position, a primary relay including an armature for yieldably moving the actuator so as to move the brake element to the brake engaged position, stop means on the primary relay armature, a secondary relay including an armature biased into engagement with the stop means on the primary relay armature so as to cause the actuator to maintain the brake element in the engaged position, electrical means sequentially energizing and deenergizing the relays so as to cause the brake element to be moved to and from the engaged position, and releasing means so arranged as to release the locking means and operatively mechanically connected to the secondary relay armature thereby also causing the secondary relay armature to be withdrawn from engagement with the stop means so as to permit the brake element to be moved from the engaged position in event of failure of the electrical means and so as to permit the wheel brake control member to move to the wheel brake disengaged position.

9. In a brake system for a vehicle, the combination of an emergency wheel brake, a transmission parking brake including a locking gear revolvable with a transmission output shaft, a pawl pivotally mounted for movement to and from an engaged position relative to the locking gear so as to prevent rotation of the transmission output shaft, a brake actuator for maneuvering the pawl, a wheel brake control member movable between brake engaged and brake disengaged positions for operating the wheel brake, means locking the wheel brake control member in brake engaged position, a primary relay including an armature for yieldably moving the actuator so as to move the pawl to the engaged position, stop means on the primary relay armature, a secondary relay including an armature biased into engagement with the stop means on the primary relay armature so as to cause the actuator to maintain the pawl in the engaged position, electrical means sequentially energizing and deenergizing the relays so as to cause the pawl to be moved to and from the engaged position, and releasing means so arranged as to release the locking means and operatively mechanically connected to the secondary relay armature thereby also causing the secondary relay armature to be withdrawn from engagement with the stop means so as to permit the pawl to be moved from the engaged position in event of failure of the electrical means and so as to permit the wheel brake control member to move to the wheel brake disengaged position.

10. In a brake system for a vehicle provided with a wheel drive shaft, the combination of a wheel brake, a wheel drive shaft brake, a wheel brake control member movable between brake engaged and brake disengaged positions for operating the wheel brake, means locking the wheel brake control member in the brake engaged position, an actuator for the wheel drive shaft brake, a primary relay including an armature for moving the actuator so as to cause the wheel drive shaft brake to be engaged, a secondary relay for coacting with the primary relay so as to maintain the wheel drive shaft brake engaged, electrical means sequentially energizing and deenergizing the relays so as to cause the wheel drive shaft brake to be engaged and disengaged, a release lever so arranged as to effect a release of the locking means and permit the wheel brake control member to return to the brake disengaged position, and a yieldable connection between the secondary relay armature and the release lever, the yieldable connection being so adapted that, when the release lever is maneuvered to release the locking means, the secondary relay is released so as to allow the wheel drive shaft brake to be disengaged.

11. In a brake system for a vehicle, the combination of an emergency wheel brake, a transmission parking brake including a locking gear revolvable with a transmission output shaft, a pawl pivotally mounted for movement to and from an engaged position relative to the locking gear so as to prevent rotation of the transmission output shaft, a brake actuator for maneuvering the pawl, a wheel brake control member movable between brake engaged and brake disengaged positions for operating the wheel brake, means locking the wheel brake control member in brake engaged position, a primary relay including an armature for yieldably moving the actuator so as to move the pawl to the engaged position, stop means on the primary relay armature, a secondary relay including an armature biased into engagement with the stop means on the primary relay armature so as to cause the actuator to maintain the pawl in the engaged position, electrical means sequentially energizing and deenergizing the relays so as to cause the pawl to be moved to and from the engaged position, a release lever so arranged as to release the locking means and permit the wheel brake control member to return to the brake disengaged position, and a yieldable connection between the secondary relay armature and the release lever, the yieldable connection being so adapted that, when the release lever is maneuvered to release the locking means, the secondary relay armature is disengaged from the stop means thereby permitting the pawl to be moved from the engaged position.

References Cited in the file of this patent

UNITED STATES PATENTS

| | | |
|---|---|---|
| 2,702,609 | Frazier et al. | Feb. 22, 1955 |
| 2,705,551 | Morphet | Apr. 5, 1955 |
| 2,725,130 | Martin | Nov. 29, 1955 |
| 2,812,837 | Khan | Nov. 12, 1957 |
| 2,817,420 | Ulinski | Dec. 24, 1957 |
| 2,821,275 | Martin | Jan. 28, 1958 |
| 2,860,731 | Hause | Nov. 18, 1958 |
| 2,867,309 | Martin | Jan. 6, 1959 |
| 2,882,421 | Mendenhall | Apr. 14, 1959 |
| 2,964,135 | Sand | Dec. 13, 1960 |
| 2,974,752 | Howard | Mar. 14, 1961 |